(12) United States Patent
Tuunanen (10) Patent No.: US 6,760,425 B2
(45) Date of Patent: Jul. 6, 2004

(54) INTERWORKING BETWEEN SERVICES IN TELECOMMUNICATIONS NETWORK

(75) Inventor: Heikki Tuunanen, Espoo (FI)

(73) Assignee: Nokia Corporation, Espoo (FI)

( * ) Notice: Subject to any disclaimer, the term of this patent is extended or adjusted under 35 U.S.C. 154(b) by 48 days.

(21) Appl. No.: 09/835,427

(22) Filed: Apr. 16, 2001

(65) Prior Publication Data

US 2001/0053217 A1 Dec. 20, 2001

Related U.S. Application Data

(63) Continuation of application No. PCT/FI99/00884, filed on Oct. 25, 1999.

(30) Foreign Application Priority Data

Oct. 30, 1998 (FI) .............................................. 982364 U (51) Int. Cl.[7] .............................................. H04M 7/00
(52) U.S. Cl. ............................ 379/221.08; 379/207.02; 379/221.09; 379/221.12
(58) Field of Search ........................... 379/207.02, 219, 379/221.08, 221.09, 221.12, 230, 243, 201.02, 201.05

(56) References Cited

U.S. PATENT DOCUMENTS

| | | | | |
|---|---|---|---|---|
| 5,367,566 A | * | 11/1994 | Moe et al. .................... | 379/243 |
| 5,430,719 A | * | 7/1995 | Weisser, Jr. .................. | 370/389 |
| 5,920,618 A | * | 7/1999 | Fleischer, III et al. .. | 379/221.09 |
| 5,946,383 A | * | 8/1999 | Havens et al. ......... | 379/221.09 |
| 5,999,610 A | * | 12/1999 | Lin et al. ................ | 379/207.02 |
| 6,018,574 A | * | 1/2000 | Malik .......................... | 379/219 |

FOREIGN PATENT DOCUMENTS

WO    WO 98/04090    1/1998

OTHER PUBLICATIONS

"Intelligent Network (IN); Intelligent Network Capability Set 1 (CS1); Core Intelligent Network Application Protocol (INAP); Part 1: Protocol specification"; ETS 300–374–1, European Telecommunication Standard, Cedex, France, Sep. 1994.
International Search report for PCT/FI99/00884.

* cited by examiner

*Primary Examiner*—Bing Bui
(74) *Attorney, Agent, or Firm*—Squire, Sanders & Dempsey L.L.P.

(57) ABSTRACT

The invention concerns interworking between distributed services in a telecommunications network, especially in an intelligent network. The invention is based on the idea that at least one new Interworking Point is introduced to the call handling model and with the aid of this Interworking Point the interworking between the distributed services is implemented. The Interworking Point can be defined as either a point where instructions received from one service program are reported to interested service programs or as a point where a service to be carried out by the responsible service program is requested by some other service program. The interworking points are armed by the service programs, and the service programs which armed the interworking point are informed of the encounter with an interworking point.

8 Claims, 11 Drawing Sheets

INTERWORKING BETWEEN SERVICES IN TELECOMMUNICATIONS NETWORK

This appn is a con of PCT/FI99/00884, Oct. 25, 1999.

FIELD OF THE INVENTION

The invention relates to interworking between distributed services in a telecommunications network, especially in an intelligent network.

BACKGROUND OF THE INVENTION

The rapid development of the telecommunication field has made it possible for operators to provide users with services of many different types. One such network architecture providing advanced services is called the Intelligent Network, for which the abbreviation IN is generally used. Examples of such services are the Virtual Private Network VPN, which allows the use of short numbers between subscribers of the private network, and the Personal Number, where the intelligent network re-routes calls made to the personal number in a manner controlled by the subscriber. IN-services are utilized by various networks, such as mobile communications networks and fixed networks connected to IN.

Figure 1:
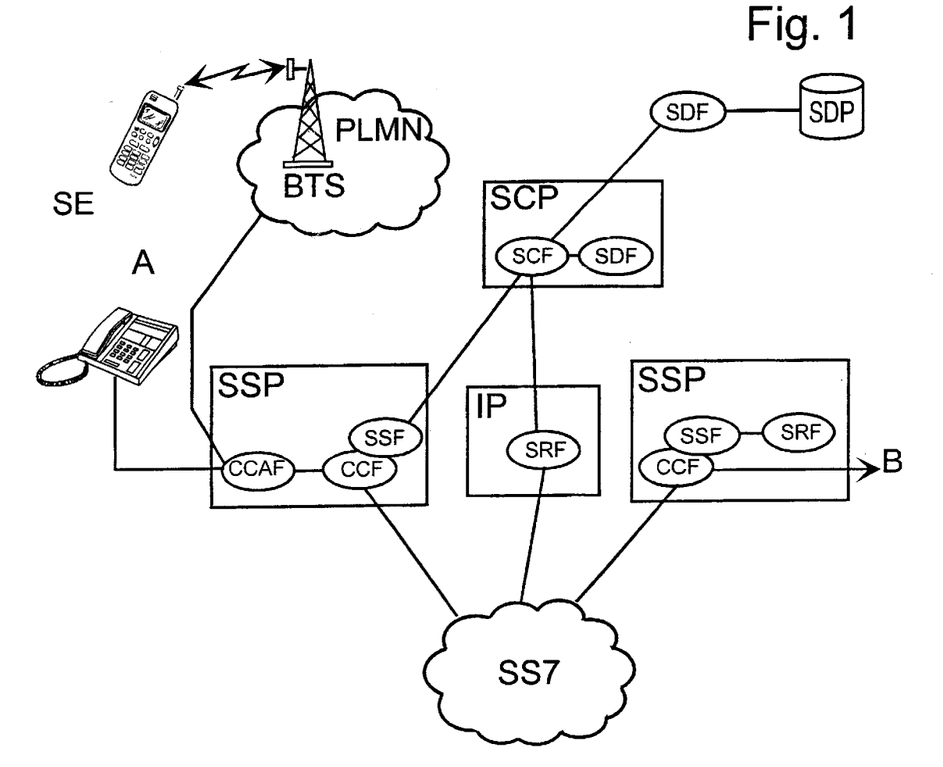
FIG. 1 shows parts of an intelligent network structure which are essential to the invention.

The physical architecture of the intelligent network is illustrated in FIG. 1, where the physical entities are shown as rectangles or cylinders and the functional entities located in them are shown as ovals. This architecture is described briefly below, since references will be made to an intelligent network environment in the description of the invention to follow. An interested reader may acquire a more detailed understanding of the intelligent network from ITUT recommendations Q.121X or from Bellcore's AIN recommendations, for example. ETS 300 374-1 CoreINAP terms will be used in the description of the invention and its background, but the invention can also be used in intelligent networks implemented in accordance with other intelligent network standards.

The Subscriber Equipment SE, which may be a telephone, a mobile station, a computer, or a fax, for example, is either connected directly to a Service Switching Point SSP or to a Network Access Point NAP. A service switching point SSP provides the user with access to the network and attends to all necessary dialing functions. The SSP is also able to detect the need for an intelligent network service request. In functional terms, the SSP includes call management, routing, and service dialing functions.

The Service Control Point SCP includes Service Logic Programs SLP, which are used to produce intelligent network services. In the following, "service program" will also be used as a shorter form for "service logic programs".

The Service Data Point SDP is a database containing data about the subscriber and the intelligent network which the SCP service programs use for producing individualized services. The SCP may use SDP services directly by way of a signaling or data network.

The Intelligent Peripheral IP provides special functions, such as announcements, and voice recognition.

The signaling network shown in FIG. 1 is a network according to Signalling System Number 7 (SS7), a known signaling system described in the Specifications of Signalling System No. 7 of the CCITT (nowadays ITU-T), Melbourne 1988.

The Call Control Agent Function (CCAF) ensures that the end user (subscriber) has access to the network. Access to IN-services is implemented through additions made to existing digital exchanges. This is done by using the Basic Call State Model BCSM, which describes the various stages of call handling and includes points called Detection Points DP, where the call handling can be interrupted in order to start intelligent network services. At these detection points, the service logic entities of the intelligent network are permitted to interact with the basic call and connection control capabilities. Therefore, Detection Points DP describe those points in call and connection processing where the transfer of control can occur.

In the exchange, the call set-up is divided into two parts: the call set-up in the originating half and the call set-up in the terminating half. As a rough description, call handling in the originating half is related to the services of the calling subscriber, while call handling in the terminating half is related to the services of the called subscriber. The corresponding state models are the Originating Basic Call State Model (O-BCSM) and the Terminating Basic Call State Model (T-BCSM). The BCSM is a high-level state automaton description of those Call Control Functions (CCF) needed for setting up and maintaining a connection between the users. Functionality is added to this state model with the aid of the Service Switching Function (SSF) (cf. partial overlapping of CCFs and SSFs in FIG. 1) to make it possible to decide when intelligent network services (IN-services) should be requested. When IN-services have been requested, the Service Control Function (SCF), including the service logic of the intelligent network, attends to the service-related processing (of call handling). Thus, the Service Switching Function SSF connects the Call Control Function CCF to the Service Control Function SCF and allows the Service Control Function SCF to control the Call Control Function CCF.

Figure 2A:
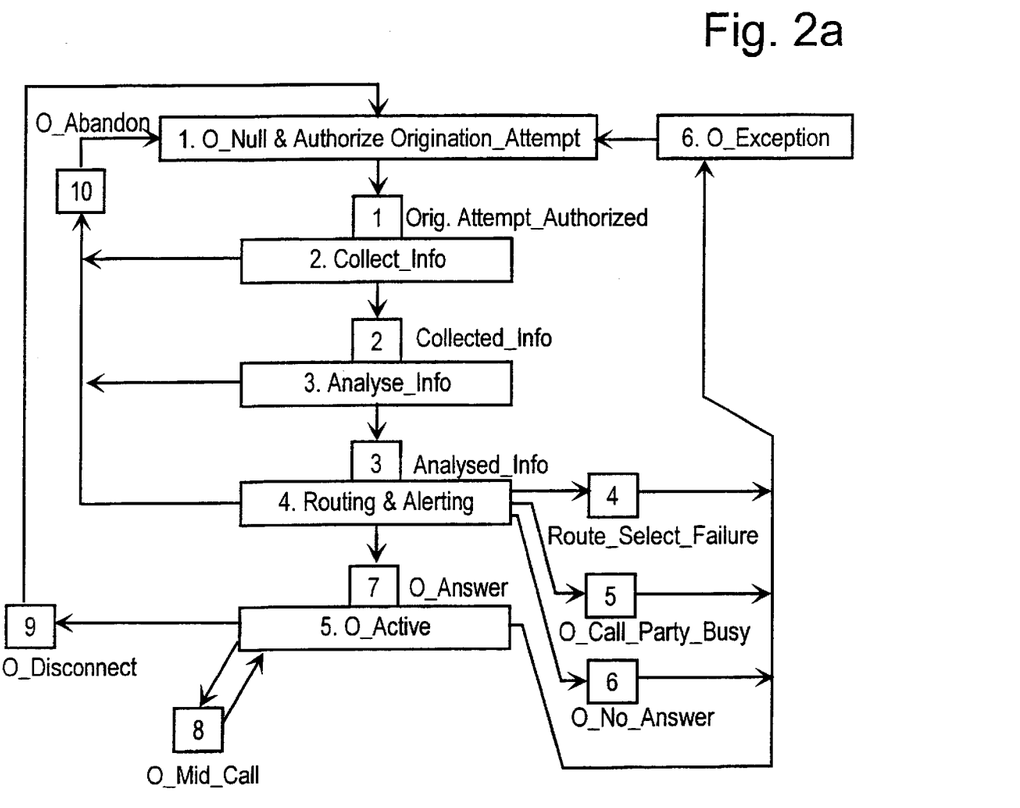
FIG. 2a shows an Originating Basic Call State Model as a flow chart.
Figure 2B:
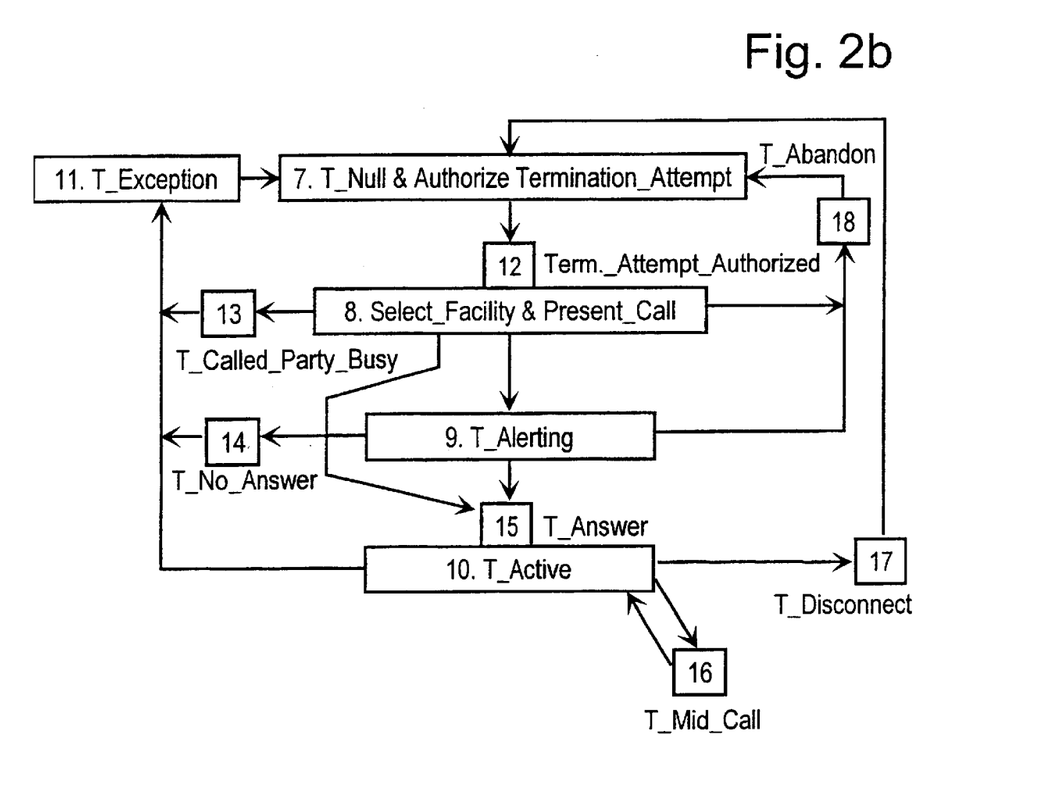
FIG. 2b shows a Terminating Basic Call State Model as a flow chart.

FIGS. 2a and 2b show simplified flow charts of the Basic Call State Model O-BCSM (FIG. 2a) and T-BCSM (FIG. 2b), which include both Points in Call (PICs) identifying CCF activities associated with call handling and Detection Points (DPs). Transitions in the BCSM are indicated with arrows. The Points in Call and Detection Points in FIGS. 2a and 2b are not described here in any closer detail but merely in relation with the invention later on.

The intelligent network service is implemented in such a way that in connection with the encounter of service-related detection points, such as DP1–10 and DP12–18 in FIGS. 2a and 2b, proceedings in the call handling model BCSM are suspended, and the Service Switching Point SSP asks the Service Control Point SCP for instructions with the aid of messages relayed over the SSP/SCP interface. In intelligent network terminology these messages are called operations. The SCF may request, for example, that the SSF/CCF perform certain call or connection functions, such as charging or routing actions. The SCF may also send requests to the Service Data Function (SDF), which provides access to service-related data and network data of the intelligent network. Thus the SCF may request, for example, that the SDF fetches data concerning a certain service or that it updates this data.

The Intelligent Network functions involved in interaction with the subscriber are supplemented by a Specialised Resources Function SRF providing an interface for those network mechanisms. Examples of such functions are messages to the subscriber and the collection of the subscriber's dialing.

The following is a brief description of the role of the functional entities shown in FIG. 1 in terms of IN-services. The CCAF receives the service request of the calling party, typically made by the calling party lifting the receiver and/or dialing a certain number series. The CCAF relays the service request further to the CCF/SSF for processing. The CCF has no service data, but it is programmed to identify those detection points where a SCP visit might be made. The CCF interrupts the call set-up for a moment and gives the service switching function SSF data about the detection point encountered (about the stage of the call set-up). It is the duty of the SSF through use of predetermined criteria to interpret whether a service request to the intelligent network is necessary. If this is the case, the SSF sends to the SCF a standardized IN-service request, including data related to the call. The SCF receives the request and decodes it. Then it works together with the SSF/CCF, SRF, and SDF in order to produce the requested service for the end user.

Figure 3:
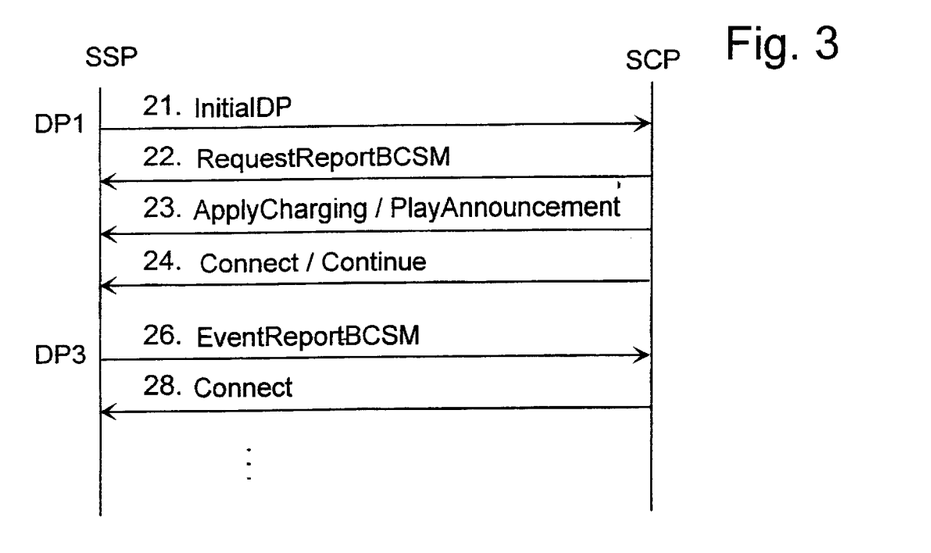
FIG. 3 shows a few basic operations of a state-of-the-art intelligent network at detection points.

As was presented above, service is started when the SSF sends to the SCF a standard IN-service request. The service request may be sent during certain stages of the call. FIG. 3 illustrates a few basic operations of a state-of-the-art function of an intelligent network at detection points. At Point 21 the SSP sends to the SCP an InitialDP service request, including basic data on the call for starting the intelligent network service. Thereupon the arming of detection points in the SSP follows. At Point 22 the SCP sends to the SSP a RequestReportBCSMEvent operation telling the SSP which detection points it should report to the SCP. Next, at Point 23 the SCP typically sends charging and/or interaction operations, such as ApplyCharging (e.g. a request for a charging report) or PlayAnnouncement (give an announcement to the subscriber). At Point 24 the SCP sends to the SSP a routing instruction, such as Connect (route the call to a new number) or Continue (continue the call set-up). When the SSP meets the detection point reserved by the SCP, the SSP sends to the SCP an EventReportBCSM operation at Point 26.

Detection points determined in the call model of an intelligent network are the primary mechanism for reporting various events occurring during the call establishment. The operations 21–24 in FIG. 3 described above relate to a detection point called the Trigger Detection Point (TDP). The SSP may make an initial inquiry concerning a service to the SCP only at a TDP service-related detection point. Therefore, a new IN-service is initiated at the TDP. At what is termed a Trigger Detection Point-Request (TDP-R), the processing of the call is stopped until the SSP receives instructions from the SCP. Thus, a control relationship is formed between the SSP and the service program in question. At the Trigger Detection Point-Notification (TDP-N), only notification of the encounter of the service-related detection point is sent from the SSP to the SCP, and call handling is continued without waiting for instructions from the SCP. Another type of detection point is the Event Detection Point (EDP). Point 26 in FIG. 2 shows a moment when in the course of a call an EDP detection point is encountered. The SSP reports on the encounter with this service-related detection point to the SCP, which at Point 28 sends additional call instructions to the SSP. The Event Detection Point-Request (EDP-R) is a detection point where the processing of the call is suspended until the SCP sends additional instructions. The arming of the EDP-R detection points creates a control relationship between the SSP and a particular service program of the SCP. A control relationship is established when a session is going on between the call set-up half and the SCF, during which the SCF may give instructions that change the handling of the call. In a monitor relationship the SCP is not able to affect the progress of the call handling; it can only ask the SSP to report on various events relating to the call. In a monitor relationship, only the Event Detection Point-Notification (EDP-N) may be armed.

In accordance with the current intelligent network standard, several monitor relationships but only one control relationship can relate to a call (single point of control). However, it has been proposed that a multiple point of control (MPC) be established wherein several service programs can interact with the call handling. The problem with such a multiple point of control is that individual service programs are not aware of the call handling instructions the SSP has received from other service programs simultaneously controlling the call. Therefore, the call can be released by one service program sending a ReleaseCall operation, and the other service programs notice that the call has ended with an error, for example. This prevents controlled release of all services related to the call. In multiple point of control, it is known that service programs within one SCP can communicate with one another. The problem in facilitating the communication within one SCP is that the service programs need to know addresses of one another, and they usually need to conform to the same protocol, such as CoreINAP or CAMEL (Customized Applications for Mobile Enhanced Logic).

BRIEF SUMMARY OF THE INVENTION

It is the purpose of this invention to implement effective interworking between distributed services in a telecommunications network, especially in an intelligent network.

This purpose is achieved through a method and a telecommunications network according to the invention which are characterized by the independent claims. Different embodiments of the invention are presented in the dependent claims.

The invention is based on the idea that at least one new Interworking Point is introduced to the call handling model, and with the aid of this Interworking Point the interworking between the distributed services is implemented. The Interworking Point can be defined as either a point where instructions received from one service program are reported to interested service programs or as where a service to be carried out by the responsible service program is requested by some other service program. The interworking points are armed by the service programs, which are in turn informed of the encounter with an interworking point.

Interworking of distributed services has the advantage that service programs can request service within the authorization of other service programs without knowing the service program performing the requested service. The interworking of distributed services is thus made effective and facile. The service programs need not all have the same protocol, nor do they need to know the addresses of the other service programs with which they are interworking.

Another advantage of the invention is that it eliminates the need for a complicated mechanism for communication between service programs or service control points, as the control of interworking is maintained at the switching point.

LIST OF FIGURES

The invention is now described more closely in connection with preferable embodiments, with reference to the examples shown in FIGS. 4–9 in the appended drawings, wherein.

BRIEF DESCRIPTION OF THE INVENTION

Figure 4A:
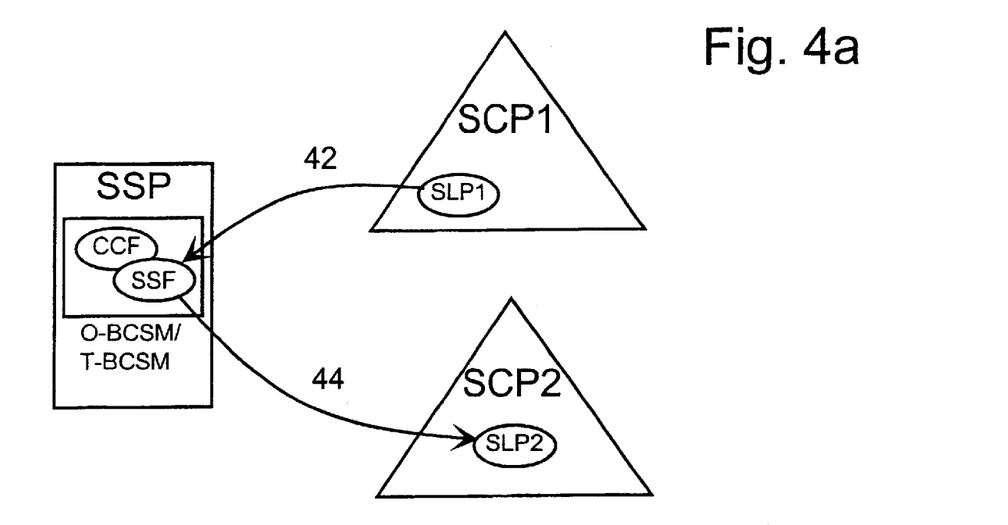
FIGS. 4a and 4b show an intelligent network structure where interworking according to the invention is implemented.

In the following, the invention will be described more closely with reference to FIGS. 4a and 4b, which show an intelligent network structure with interworking according to the invention between service programs. In FIG. 4a an example of an appeal type of interworking point is described, and in FIG. 4b an example of a report type of interworking point. In the examples shown in FIGS. 4a and 4b, intelligent network services are distributed to two service programs, SLP1 and SLP2, which are located at two control points, SCP1 and SCP2 respectively. Let us assume that service program SLP2 has authorization to release the call and that service program SLP1 is a subscriber-based PrePaid service, where the SCP database maintains a certain time or a total number of charging pulses allocated to the subscriber to be available for the calls of the subscriber in question. If the number of charging pulses or the time used by the subscriber for a call runs out, the call is released.

In the example in FIG. 4a, when the subscribers prepaid balance has run out, service program SLP1 sends the switching point SSP a ReleaseCall operation or some other operation requesting that the call be released (stage 42). Interworking point IWP1 according to the invention is encountered, as this request requires interworking between the activities of service programs SLP1 and SLP2. Service program SLP2 has armed interworking point IWP1 and therefore receives at stage 44 an operation from the SSP, such as the EventReportBCSM operation, informing of the encounter with IWP1. Service program SLP2 gives instruction to release the call, such as a ReleaseCall operation, when it deems this action to be appropriate.

Figure 4B:
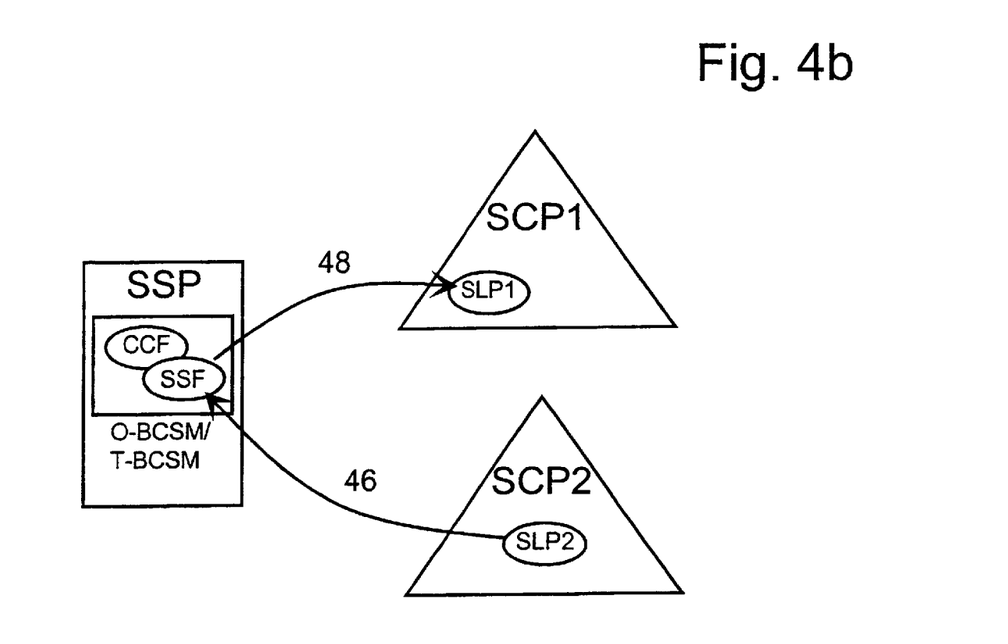

In the example in FIG. 4b, the service program SLP2 sends a ReleaseCall operation (stage 46). This action causes interworking point IWP2 according to the invention to be encountered. Service program SLP1 has armed interworking point IWP2 and thus receives at stage 48 an operation, such as EventReportBCSM, reporting that interworking point IWP2 was encountered, which in this example means that the call is being released. At that point, service program SLP1 can provide instructions for statistics or charging purposes, for example.

The examples of FIGS. 4a and 4b can also be combined in such a way that the call handling model BCSM includes at least these two interworking points IWP1 and IWP2. In that case, after the encounter with IWP1 and the ReleaseCall operation from SLP2, IWP2 is encountered.

As described above in the examples, the appeal type of interworking point is used for requesting that an action be performed by some service program and the report type of interworking point is used for reporting that an action has taken place or is being carried out. These appeal and report type of interworking points can be used separately or together in one BCSM. The appeals and reports are relayed from one service program to at least one other service program via the switching point, on condition that at least one service program has armed the interworking point in question.

The use of interworking points IWP according to the invention is similar to the use of detection points DP according to prior art. These new special differ from the prior art detection points DP in that they reflect events of service programs whereas the detection points reflect events of the call establishment. The interworking point is encountered in consequence of a certain predetermined action performed by some service program, such as an action affecting the call handling or a request that another service program carry out an action that will affect the call handling. Another difference when compared to the prior art detection points DP is that when an interworking point according to the invention is met, the call processing of the CCF is not necessarily suspended. For example, a request that another service program release the call may be totally invisible to the CCF when the service program responsible for releasing the call denies the request. The same applies to a report to service programs about an action. On the other hand, the encounter with an interworking point according to the invention can be defined to suspend the call handling until the functionality according to the invention has been carried out. The above described applies both to appeal and report types of interworking points. The interworking points IWP are armed in the same manner as the detection points DP, i.e. the service programs indicate which are the IWPs the encounter of which they want to be informed. The arming of the interworking points can be carried out through a RequestReportBCSMEvent operation or some other suitable operation. An interworking point can be armed as a Trigger Interworking Point TIP or an Event Interworking Point EIP in the same manner as the TDP or EDP is armed in connection with detection points. Furthermore, an appeal type of interworking point, that is, an interworking point requesting another service program to carry out an operation, can be armed as TIP-R, TIP-N, EIP-R and EIP-N, and a report type of interworking point, that is, an interworking point reporting service programs that the predetermined action is being done by one service program, can be armed as TIP-R, TIP-N, EIP-R and EIP-N. If an appeal or report type of interworking point is armed as a notification point, i.e. TIP-N or EIP-N, the service program notified can send instructions to the SSP in a spontaneous operation when needed for statistics, charging, and/or post-processing, for example.

Figure 5A:
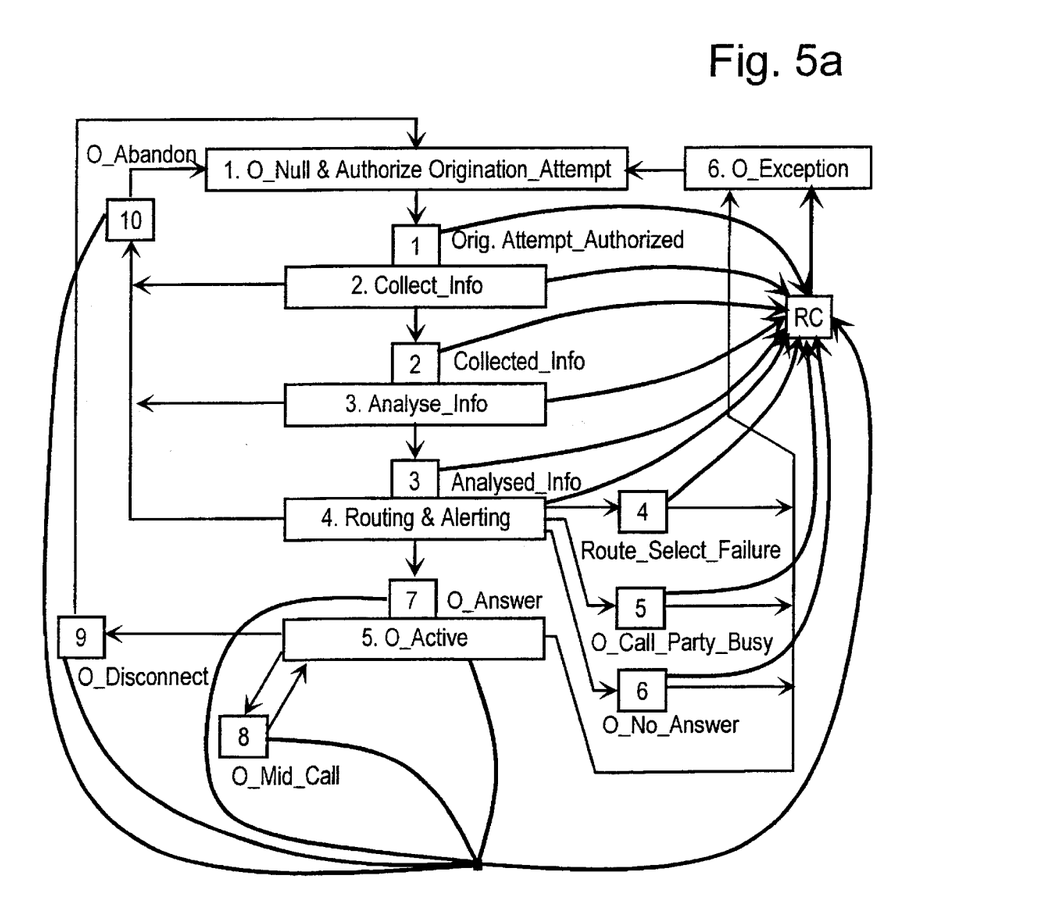
FIGS. 5a and 5b show in a BCSM an example of the use of an interworking point according to the invention in relation to call release.

Next, the use of interworking points according to the invention is described with the aid of a few examples referring to BCSM flow charts in FIGS. 5a, 5b, 6, 7a, and 7b, where curved lines with arrowheads illustrate the modifications rendered to the call handling model according to the invention. FIG. 5a shows in an O_BCSM a report type of interworking point related to a call release. As is shown by the curved lines, the encounter of the interworking point RC presented in FIG. 5a can be triggered at any of the detection points DP1–10 or any of the points in call PIC2–5 as the ReleaseCall operation is allowed at all these points according to prior art. When the interworking point RC is encountered, i.e. when instructions for release of the call have been sent by a service program authorized to do so, the switching point reports this to all the service programs which have armed this interworking point. Thus it is reported to these service programs that the call is being released. Instructions are waited from service programs which have armed the interworking point as a request point, i.e. TIP-R or EIP-R. In the call handling model BCSM, the call then proceeds to PIC6 O_Exception, which handles all call releases except those which the subscriber has activated. At PIC6 the call resources are released according to prior art.

Figure 5B:
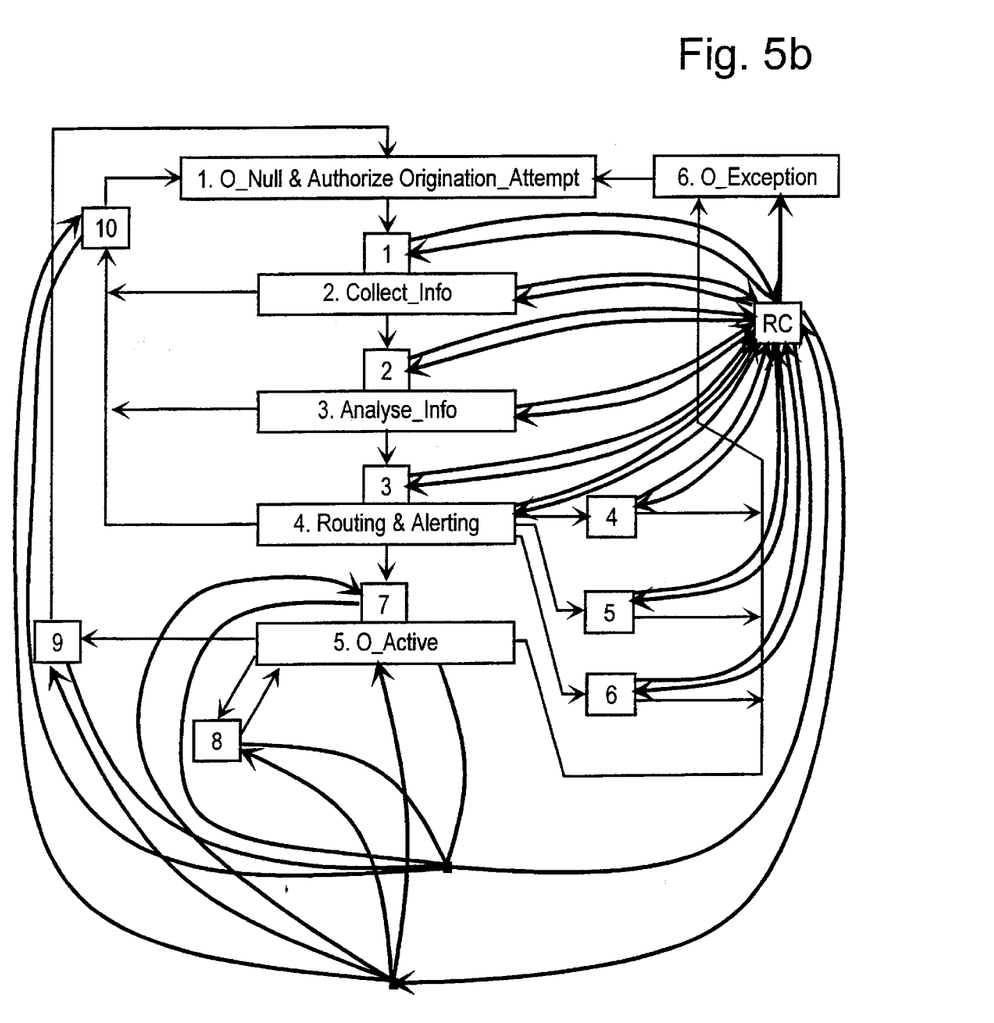

FIG. 5b shows in an O_BCSM an appeal type of interworking point RC related to call release. As described above in connection with FIG. 5a, in FIG. 5b the interworking point RC encounter can also be triggered at any of the detection points DP1–10 or any of the points in call PIC2–5. The interworking point RC in FIG. 5b is encountered when the release of the call is requested by a service program which is not authorized to release the call. Through a ReleaseCall operation or some other request operation, the unauthorized service program can request that the SSP release the call. When encountering the interworking point RC, the switching point sends an operation about the encounter, such as a EventReportBCSM, to all the service programs which have armed this interworking point and then waits for instructions. After receiving this operation, the service program can examine whether the call release request from the unauthorized service program is acceptable. If it is not acceptable, the call is continued normally from the point where the original call release request was received from the unauthorized service program. If no service program has armed the interworking point RC, the request for release the call is not attended to, and the call is continued from the point before the transition to the interworking point. In the call handling model BCSM, the call thus either proceeds back to the point before the transition to the interworking point or to the PIC6 O_Exception, where the call resources are released according to prior art. Note also that if the interworking point is encountered during the processing being carried out at a Point in Call, the CCF may also continue call processing at the PIC undisturbed while the processing is being carried out at the interworking point by the service program(s) which armed it. Therefore, call processing suspension is not necessarily needed.

In relation to call release, the functionality of the invention is similar in the originating and the terminating half of the call. Therefore, interworking points of the kind presented in FIGS. 5a and 5b can be inserted in a T_BCSM as well.

Figure 6:
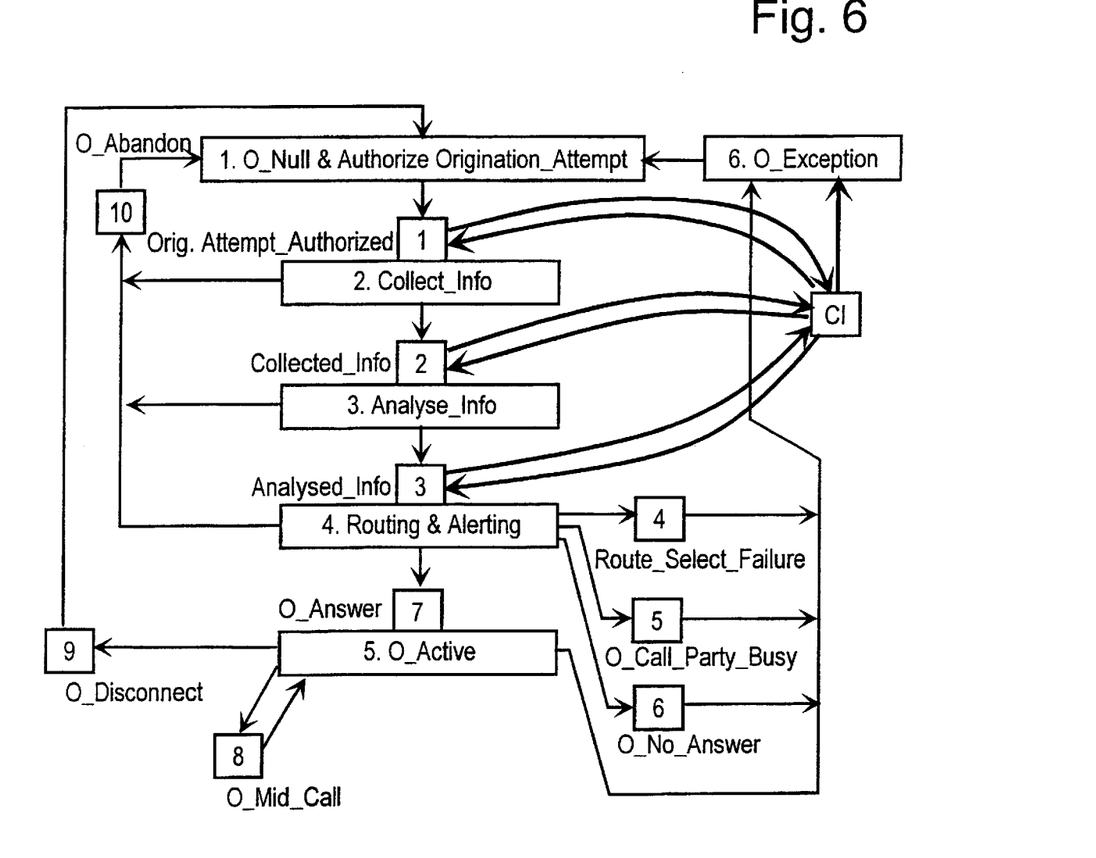
FIG. 6 shows in a BCSM an example of the use of an interworking point according to the invention in relation to information collecting.

An example of an O_BCSM with an appeal type of interworking point CI related to information collecting is shown in FIG. 6. This interworking point is defined so that it can be encountered only via detection points DP1–3. The interworking point CI is encountered after the request to collect information is received at the SSP from a service program wishing some other service program to collect information. The SSP sends an operation about the encounter of the interworking point, such as an EventReportBCSM, to the service programs which have armed the interworking point CI. After that the responsible service program can perform information collection. In the call handling model BCSM, the call then proceeds back to the detection point where the request was received at the SSP or to the PIC6 O_Exception, where the call resources are released according to prior art.

Figure 7A:
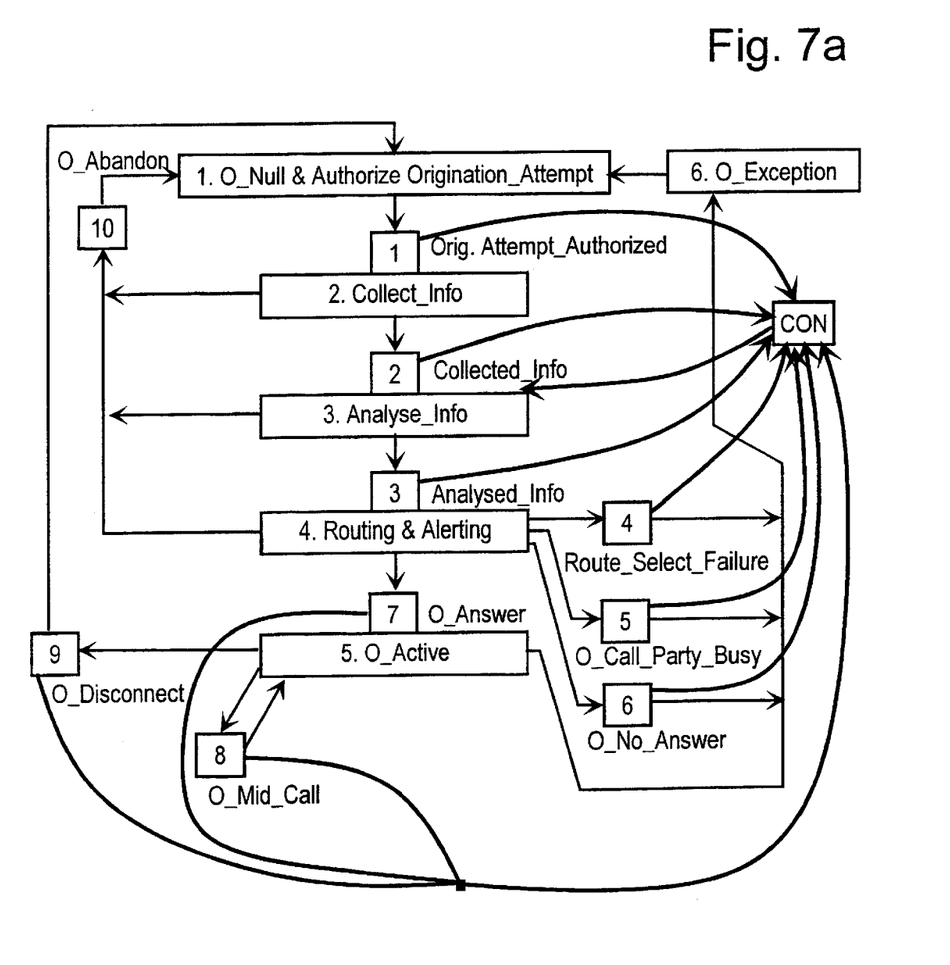
FIGS. 7a and 7b show in a BCSM an example of the use of an interworking point according to the invention in relation to changing the called subscriber's number.

FIG. 7a shows an example where a report type of interworking point CON related to a Connect operation with a new called subscriber's number is incorporated in an O_BCSM. This interworking point can be encountered only via detection points DP1–9. The interworking point CON is encountered after one service program has sent to the SSP instructions to change the called subscriber's number (B-subscriber number) in an operation, such as a Connect operation. At the interworking point CON, the SSP reports to all service programs which have armed this interworking point that the interworking point CON has been encountered, which in this case means that the called subscriber's number has been changed. If any of these service programs have armed this interworking point as a request point, i.e. TIP-R or EIP-R, the SSP waits for instructions from these service programs. In the call handling model BCSM, the call then proceeds to PIC3 Analyse_info, where the new called subscribers number is analyzed according to prior art.

Figure 7B:
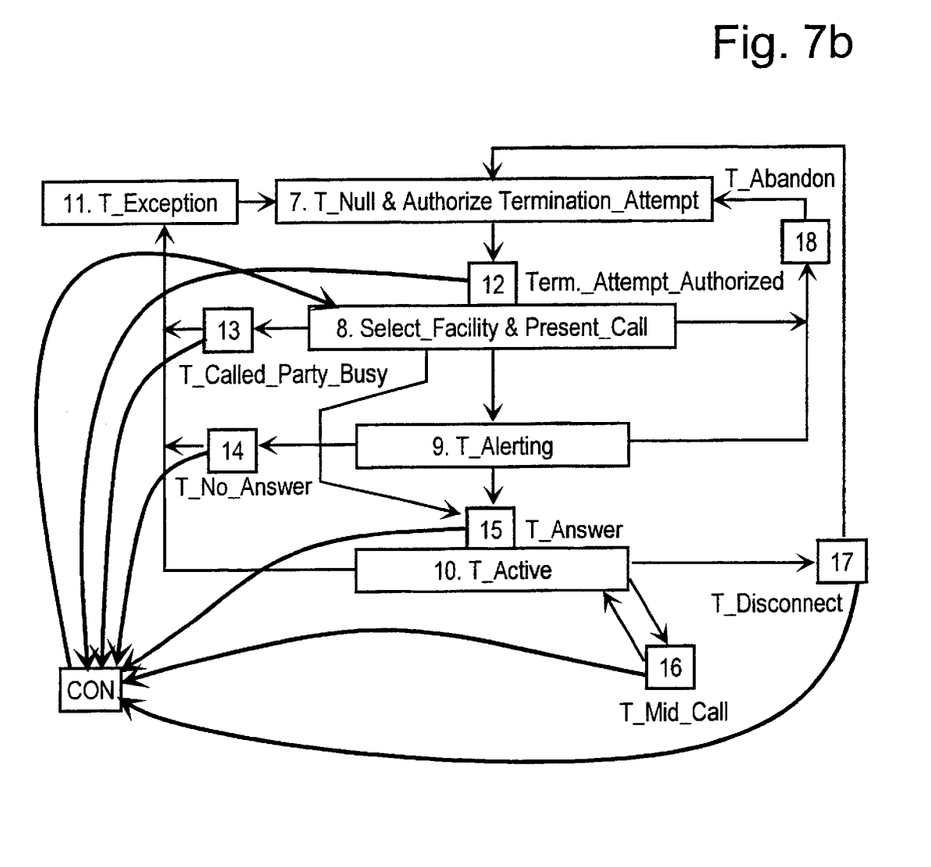

FIG. 7b shows the example of FIG. 7a in the terminating half of the call (T_BCSM). Now, the interworking point CON can be encountered via detection points DP12–17. The encounter of the interworking point and reports from the SSP function in a manner similar to the description of FIG. 7a. In the call handling model BCSM, after reaching the interworking point the call proceeds to PIC8 Select_Facility & Present_Call.

Figure 8:
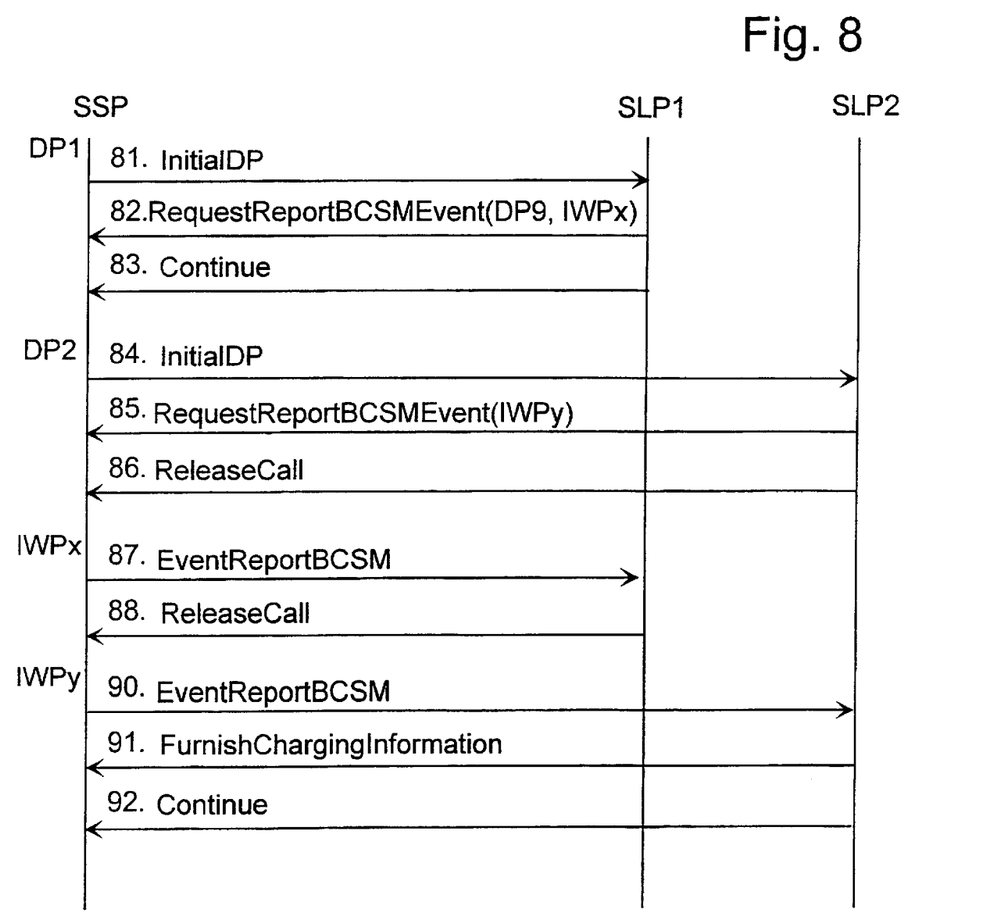
FIG. 8 shows as network operations the use of two interworking points involved in the same network action.

FIG. 8 shows by means of a signaling diagram the use of both appeal and report types of interworking points IWPx and IWPy in relation to the same network operation, which in this example is a call release. In the example in FIG. 8, it is assumed that SLP1 is authorized to release the call and SLP2 is not authorized to do this. At detection point DP1, the SSP first starts SLP1 with an InitialDP operation (Point 81). At Point 82, SLP1 responds with a RequestReportBCSMEvent operation arming detection point DP9 O_Disconnect and interworking point IWPx "Call Release Requested by SCP". The detection point which is armed is of a request type and the interworking point which is armed is of an appeal type. Next, SLP1 sends a Continue operation to the SSP (Point 83). At detection point DP2, the SSP starts SLP2 with an InitialDP operation (Point 84). At Point 85, SLP2 sends to the SSP a RequestReportBCSMEvent operation arming interworking point IWPy "Call Released by SCP". In this example this interworking point is armed as a request point EIP-R. Then, SLP2 sends a ReleaseCall operation (Point 86) after noticing that a PrePaid service has run out of charging pulses, for example. As the authorization to release the call is reserved for SLP1, a ReleaseCall operation from SLP2 is seen as an appeal that the call be released. Some other request operation can be used for this purpose as well. This request from SLP2 results in an encounter with the interworking point IWPx. In an EventReportBCSM operation at Point 87, the SSP informs SLP1, which has armed interworking point IWPx, of the encounter, i.e. of the need to release the call. The identity of the service program requesting the action, in this example the identity of SLP2, the reason for the call release, and/or other relevant information can be attached to this operation when needed. SLP1 deems the release of the call to be appropriate and sends to the SSP a ReleaseCall operation (Point 88). The ReleaseCall operation results in an encounter with interworking point IWPy. At Point 90, the SSP informs SLP2, which has armed interworking point IWPy, of the encounter, i.e. of the call being released, in an EventReportBCSM operation and waits for instructions from SLP2. The SSP can attach information to the EventReportBCSM operation about the identity of the service program releasing the call, the reason for the call release, and/or other relevant information, when needed. At Point 91, SLP2 can still affect the call handling before release of the call resources, and it responds with a FurnishChargingInformation operation requesting the SSP to register a call record. Finally, at Point 92, SLP2 sends a Continue operation to end the dialogue.

Figure 9:
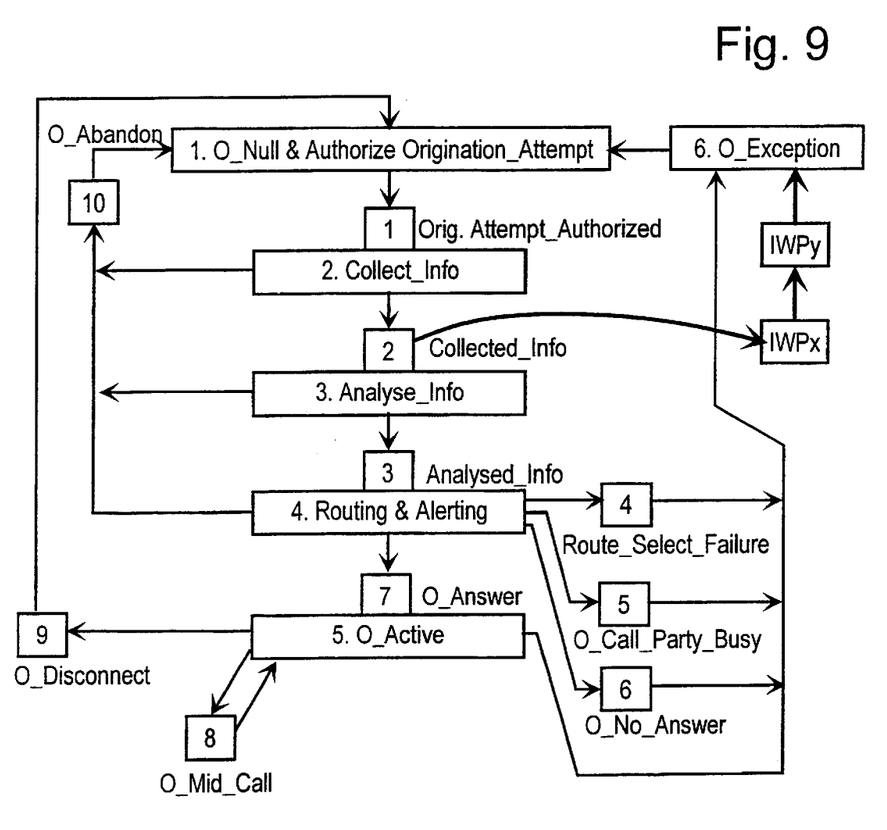
FIG. 9 shows two interworking points in a BCSM.

FIG. 9 shows as an O_BCSM flow chart the example presented in FIG. 8. In the call handling model BCSM, the call proceeds from detection point DP2 to interworking point IWPx, where a need for call release is relayed to SLP1. After the SSP has received the instructions from SLP1, i.e. a ReleaseCall operation, the call proceeds to interworking point IWPy, where SLP2 is sent a report that the call is being released. Next, the call proceeds to PIC6, where the call resources are released according to prior art.

The examples described above are merely intended to illustrate the use of interworking points according to the invention. In addition to the above examples, the invention can also be used in relation to any other operation sent by a SCP or some other similar controlling mechanism in order to affect the call handling model. The encounter with an interworking point can be defined as allowable from any prior art Detection Point and/or Points in Call, as well as from some other interworking points on condition that they are reached after the switching point has contacted the service program for the first time during the call.

The drawings and the explanations related to them are only intended to illustrate the inventive idea. The interworking of distributed services in accordance with the invention may vary in detail within the scope defined by the claims. The invention can be implemented in any telecommunications networks which have some call handling model for describing points in call where transfer of control can occur. Thus, the invention can also be implemented in packet switched networks. Therefore, in this application the term "call" refers also to packet switched connections. The embodiments and implementations described above can be combined in other appropriate way when needed. Although the invention is described above mainly in terms of SCP connections, it may also be used with other kinds of connections between the switching point and a control element carrying out a functionality corresponding to the SCP. The switching unit example presented above was a SSP in an IN-network, but a mobile services switching center or any other switching unit is possible as well. The service programs described above can be switch-based services, e.g. supplementary services of the GSM, IN-services, or services similar to IN-services which have some other interface than an IN-interface between the controlling program packet and the controlled switching unit, e.g. a special number portability database or a calling name database. The invention is also applicable when using different protocols, such as CoreINAP or CAMEL, even for service programs using different protocols for contacting control points in the same BCSM. In the method according to the invention, information to be relayed may also be transferred in connection with operations other than those presented above. Partial implementation of the invention in the network is also possible. For example, implementation according to the invention can be limited to only certain service programs in the network, or the provision of interworking points can be limited to certain operations only.

What is claimed is:

1. A method of interworking between services in a telecommunications network including at least one switching point and at least two service programs, wherein the switching point has a call handling model defining points in the call for identifying events in the call and for defining interactions between the at least one switching point and the at least two service programs, wherein said call handling model further includes at least one interworking point for identifying events in a least one of the service programs, said method comprises the steps of:
   determining when an identified event of the service program is encountered;
   enabling said interworking point when said identified event is encountered; and
   supplying instructions from the switching point to interwork with the at least one other service program in response to said identified event, wherein the interworking point is enabled when one service program performs a predetermined action and the instructions are of a report type so that the other service programs which have requested that they be informed when the interworking point is enabled are sent information about the enablement.

2. The method according to claim 1, wherein the interworking point is enabled when one service program requests an operation which is under the authorization of the other service program and the instructions are of a request type so that the service request is relayed to the service programs which have requested information when the interworking point is enabled.

3. The method according to claim 2, wherein the identity of the requesting service program is attached to the service request and the service program receiving the service request carries out the requested operation when applicable.

4. The method according to claim 2, wherein the proceeding in the call handling model is not suspended when the interworking point is enabled.

5. The method according to claim 2, wherein the proceeding in the call handling model is suspended when the interworking point is enabled.

6. The method according to claim 1, wherein the interworking point is enabled when one service program performs a predetermined operation and a report is sent to the service programs which have requested information about the enablement of the interworking point.

7. A telecommunications network including at least one switching point and at least two service programs, wherein the switching point has a call handling model defining points in the call for identifying events in the call and for defining interactions between the at least one switching point and the at least two service programs, wherein said call handling model further includes at least one interworking point for identifying events in at least one of the service programs, and wherein the interworking point is enabled when an identified event of the service program is encountered and instructions are supplied from the switching point to interwork with the at least one other service program, wherein when one service program asks for an operation under the authorization of other service program, the switching point is adapted to transfer the call to the interworking point and to relay a service request to the service programs which have armed the interworking point.

8. A telecommunications network including at least one switching point and at least two service programs, wherein the switching point has a call handling model defining points in the call for identifying events in the call and for defining interactions between the at least one switching point and the at least two service programs, wherein said call handling model further includes at least one interworking point for identifying events in at least one of the service programs, and wherein the interworking point is enabled when an identified event of the service program is encountered and instructions are supplied from the switching point to interwork with the at least one other service program, wherein when one service program performs a predetermined operation, the switching point is adapted to transfer the call to the interworking point and to send a report to the service programs which have a ed the interworking point.

* * * * *